(12) United States Patent
Ota

(10) Patent No.: US 8,872,398 B2
(45) Date of Patent: Oct. 28, 2014

(54) ELECTRIC POWER TOOL

(75) Inventor: Kenichi Ota, Anjo (JP)

(73) Assignee: Makita Corporation, Anjo (JP)

( * ) Notice: Subject to any disclaimer, the term of this patent is extended or adjusted under 35 U.S.C. 154(b) by 56 days.

(21) Appl. No.: 13/466,443

(22) Filed: May 8, 2012

(65) Prior Publication Data

US 2012/0299402 A1  Nov. 29, 2012

(30) Foreign Application Priority Data

May 23, 2011  (JP) ................................. 2011-114484

(51) Int. Cl.
H02K 7/14 (2006.01)
H02K 21/22 (2006.01)

(52) U.S. Cl.
CPC .............. *H02K 21/22* (2013.01); *H02K 7/145* (2013.01)
USPC ............................. 310/50; 310/68 R; 310/91

(58) Field of Classification Search
CPC ........ H02K 7/145; H02K 21/22; H01H 9/063
USPC .......................................................... 310/50
See application file for complete search history.

(56) References Cited

U.S. PATENT DOCUMENTS

| 5,030,864 | A | | 7/1991 | Van Hout et al. |
| 5,220,228 | A | | 6/1993 | Sibata |
| 5,418,414 | A | * | 5/1995 | Ackermann et al. ...... 310/156.43 |
| 6,707,224 | B1 | * | 3/2004 | Petersen ..................... 310/254.1 |
| 7,388,312 | B2 | * | 6/2008 | Hyodo et al. ................. 310/198 |
| 2009/0179507 | A1 | * | 7/2009 | Tanimoto ......................... 310/50 |
| 2010/0052454 | A1 | * | 3/2010 | Lin .......................... 310/156.08 |

FOREIGN PATENT DOCUMENTS

| DE | 41 24 425 A1 | | 1/1992 | |
| DE | 102 19 871 A1 | | 11/2003 | |
| EP | 1 166 964 A1 | | 1/2002 | |
| GB | 2 276 770 A | | 10/1994 | |
| JP | U-2-14282 | | 1/1990 | |
| JP | A-2001-016806 | | 1/2001 | |
| JP | A-2006-087283 | | 3/2006 | |
| JP | 2006150571 | * | 6/2006 | ............... B25F 5/00 |
| JP | A-2006-150571 | | 6/2006 | |
| JP | A-2007-116818 | | 5/2007 | |
| JP | A-2011-030127 | | 2/2011 | |
| WO | WO 98/25723 A1 | | 6/1998 | |

OTHER PUBLICATIONS

Sep. 19, 2012 Extended European Search Report issued in Patent Application No. 12167502.9.
Office Action dated Jul. 29, 2014 issued in Japanese Patent Application No. 2011-114484 (with translation).

* cited by examiner

*Primary Examiner* — Terrance Kenerly
(74) *Attorney, Agent, or Firm* — Oliff PLC

(57) ABSTRACT

There is disclosed an electric power tool in which magnetic saturation seldom occurs in a tooth of a stator without increasing the size of a motor. The electric power tool includes a motor having a stator with a plurality of teeth formed circumferentially at equal intervals and axially extending groove-like slots between each tooth, with winding wires being wound around each tooth by use of the slots, and having a tubular rotor coaxially surrounding the stator with a permanent magnet of a plurality of poles on an inner peripheral surface facing distal end surfaces of the teeth of the stator. Further, the ratio of the number of poles of the permanent magnet of the rotor to the number of slots of the stator is set to be 4 to 3.

5 Claims, 7 Drawing Sheets

ELECTRIC POWER TOOL

This application claims priority to Japanese patent application serial number 2011-114484, the contents of which are incorporated herein by reference.

BACKGROUND OF THE INVENTION

1. Field of the Invention

The present invention relates to an electric power tool including a so-called outer rotor type motor in which a tubular rotor rotates around a stator.

2. Description of the Related Art

A prior art relating to an electric power tool including an outer rotor type motor as described above is disclosed in Japanese Patent Application Laid-Open No. 2006-150571.

The electric power tool disclosed in Japanese Patent Application Laid-Open No. 2006-150571 is an electric sander including an outer rotor type motor. By using an outer rotor type motor, the diameter of the rotor can be set large, and a large rotational torque can be obtained due to a high centrifugal force.

Generally, in an outer rotor type motor that is used in an electric power tool, a rotor 102 has four poles of a permanent magnet 103, and a stator 105 has six slots 106, as shown in FIG. 7.

In case where there are four poles of the permanent magnet 103, N-poles and S-poles are alternately provided on the inner peripheral surface of the rotor 102 at an interval of 90 degrees. Further, in case where there are 6 slot-stators 105, teeth 107 around which winding wires (not shown) are wound are formed at an interval of 60 degrees.

In the outer rotor type motor, the rotor 102 is arranged on the outer side of the stator 105, and accordingly, the width in the circumferential direction of each magnetic pole of the permanent magnet 103 (length of arc) is relatively large, as compared with an inner rotor type motor (a motor in which the rotor is arranged on an inner side of the stator). As a result, in the outer rotor type motor, the amount of magnetic flux passing a magnetic pole of the permanent magnet 103 is larger than that in the inner rotor type motor. Thus, in the outer rotor type motor, the amount of magnetic flux passing through the teeth 107 of the stator 104 becomes large in the magnetic circuit including the rotor 102 and the stator 105. Further, a high power magnet of large magnetic flux density has been used in recent years in order to improve a motor performance.

Thus, during the rotation of the rotor 102, when a magnetic flux from the magnetic poles of the permanent magnet 103 (refer to the narrow lines in FIG. 7) passes through a tooth 107 of the stator (refer to A and B in FIG. 7), magnetic saturation is occurred, and in some cases, further passage of the magnetic flux becomes impossible.

Accordingly, even if a high performance magnet is used, its performance cannot be fully achieved. Magnetic saturation can be suppressed by enlarging the size of the teeth 107 of the stator 105, but this approach is not desirable since it causes the size of the motor to increase.

SUMMARY OF THE INVENTION

Thus, there is a need in the art to fully utilize the performance of the magnet by preventing the magnetic saturation from occurring in the tooth of the stator without increasing the size of the motor.

One construction for an electric power tool can include a motor having a stator with a plurality of teeth formed circumferentially at equal intervals and with axially extending groove-like slots between each tooth, with winding wires being wound around each tooth by use of the slots, and also having a tubular rotor coaxially surrounding the stator and having a plurality of poles of a permanent magnet on an inner peripheral surface facing distal end surfaces of the teeth of the stator, wherein the ratio of the number of poles of the permanent magnet of the rotor to the number of slots of the stator is set to be 4 to 3.

According to this construction, the ratio of the number poles of the permanent magnet of the rotor to the number of slots of the stator is set to 4 to 3. For example, the number of poles of the permanent magnet can be set to be eight, and the number of slots of the stator to six (6-slot motor). In a 6-slot motor, the number of poles of the permanent magnet can be reduced from the conventional number of four to eight, and accordingly the width of each magnetic pole of the permanent magnet can be reduced by half in the circumferential direction (length of arc) as compared with that in the prior art, while remaining the size of each part of the motor unchanged. As a result, the amount of magnetic flux passing through a magnetic pole of the permanent magnet can be reduced approximately by half as compared with that in the prior art.

Thus, during the rotation of the rotor around the stator, even when the magnetic flux from the magnetic poles (e.g., N-poles) concentrates in one tooth of the stator, magnetic saturation seldom occurs since the amount of magnetic flux with regard to one magnetic pole is reduced by half. Accordingly, even if a high performance magnet is used, its performance can be fully achieved. That is, a high performance of the magnet can be achieved with the size of the motor unchanged.

According to another construction, an electric power tool is characterized in that the permanent magnet of the rotor is made of a rare-earth magnet.

According to this construction, the permanent magnet of the rotor is made of a rare-earth magnet whose main components are neodymium, iron, and boron.

For this reason, the magnetic flux density of the permanent magnet increases, and the power of the motor can be increased.

According to another construction, the number of poles of the permanent magnet of the rotor and the number of slots of the stator can be set to eight and six, respectively. Further, they can be set to twelve and nine, or sixteen and twelve, respectively.

According to the above, magnetic saturation seldom occurs at the tooth of the stator, and thus the performance of the magnet can be fully achieved, and the performance of the motor can be improved without increasing the size of the motor.

DETAILED DESCRIPTION OF THE INVENTION

Each of the additional features and teachings disclosed above and below may be utilized separately or in conjunction with other features and teachings to provide an improved electric power tools. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In the following, an electric power tool according to an example will be described with reference to FIG. 1 to FIG. 6. The electric power tool according to the example is a portable circular saw 10 provided with an outer rotor type brushless motor.

Figure 1:
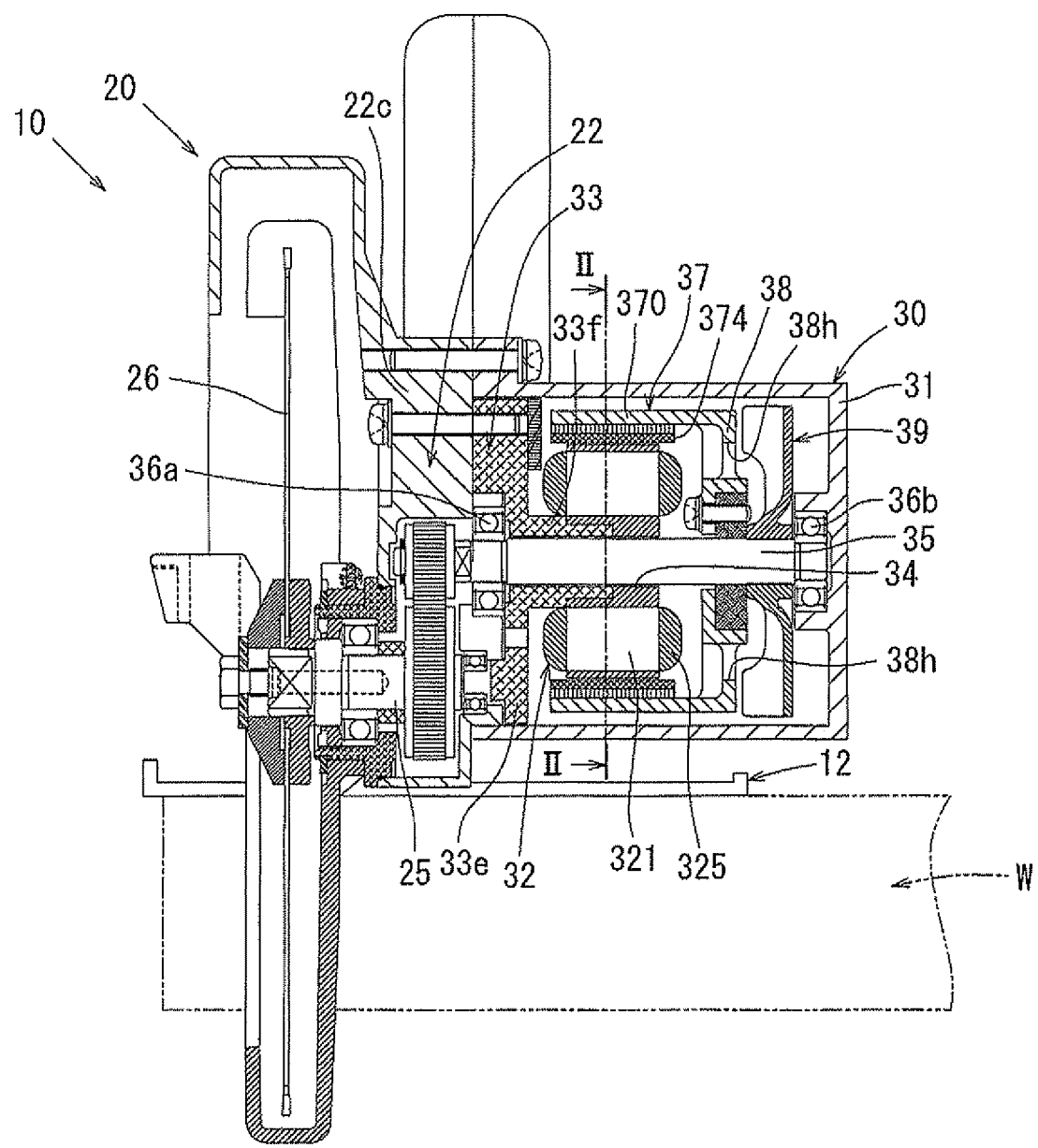
FIG. 1 is a general longitudinal sectional view of an electric power tool (portable circular saw) according to an example.

As shown in FIG. 1, the portable circular saw 10 is provided with a flat-plate-like base 12 held in face contact with an upper surface of a work W (indicated by the chain double-dashed line), and a circular saw main body portion 20 provided on the base 12. The circular saw main body portion 20 includes a brushless motor 30 serving as the drive source (hereinafter termed motor 30), a speed reduction mechanism 22 for reducing the rotational speed of the motor 30, and a disc-like rotary blade 26 mounted to a spindle 25 that is an output shaft of the speed reduction mechanism 22.

The lower side of the rotary blade 26 protrudes downwardly from the lower surface of the base 12, and the protruding part of the rotary blade 26 can cut off the work W.

As shown in FIG. 1, the motor 30 is provided with a stator 32 fixed within a motor housing 31 so as to be coaxial to the motor housing 31, and a tubular rotor 37 coaxially arranged within the motor housing 31 so as to surround the stator 32. The motor housing 31 has an opening (at the left-side end as seen in FIG. 1) covered with a disc-like stator support fitting 33, which is fixed to a housing 22c of the speed reduction mechanism 22. The stator support fitting 33 is a fitting that supports the stator 32 within the motor case 31, and includes a disc portion 33e that covers the opening of the motor case 31, and a tubular portion 33f that axially protrudes at the center of the disc portion 33r. Further, the stator 32 is coaxially connected with the distal end of the cylindrical portion 33f of the stator support fixing 33.

Figure 2:
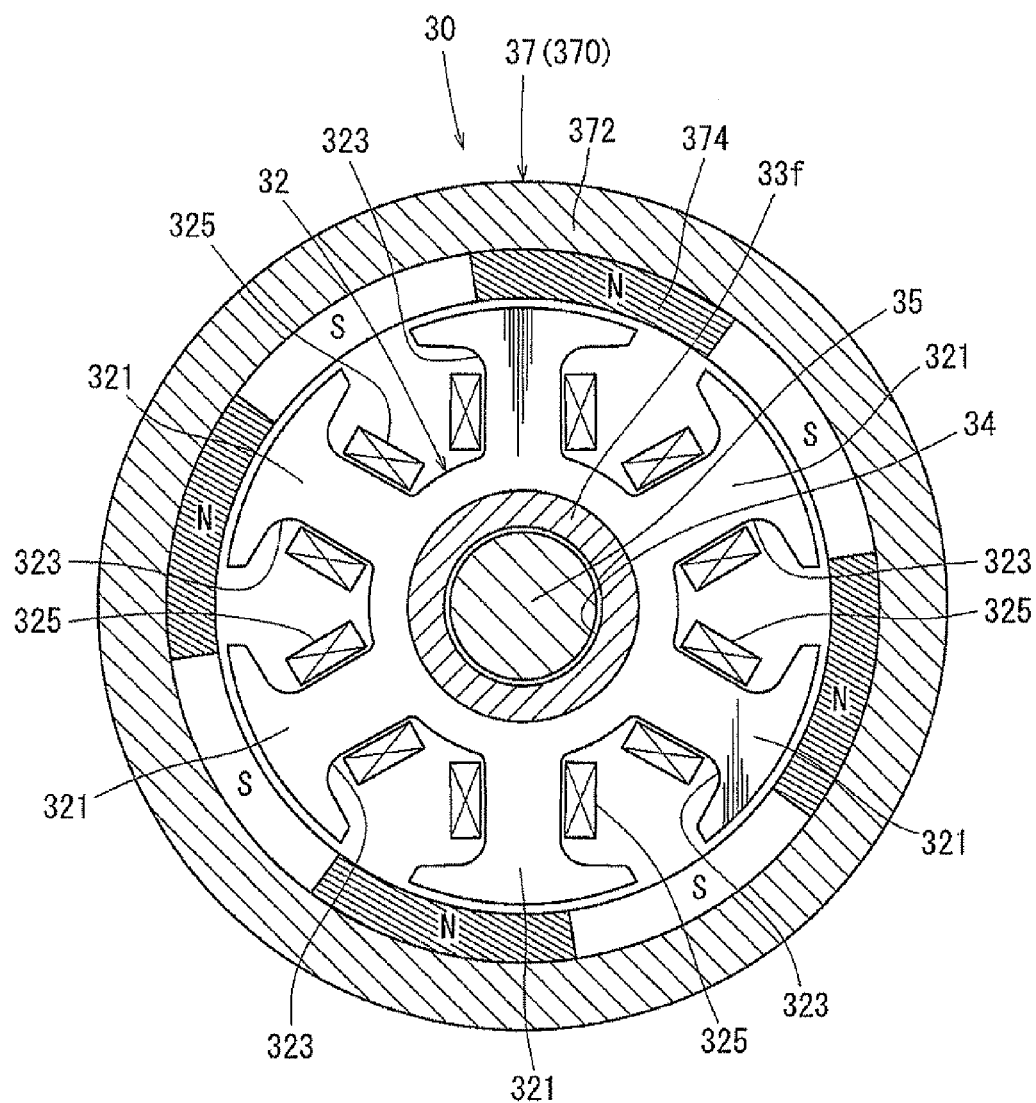
FIG. 2 is a schematic sectional view taken in a direction orthogonal to the axis of the motor (viewed along arrows II-II in FIG. 1) of the electric power tool.

As shown in FIGS. 1 and 2, the disc portion 33e and the tubular portion 33f of the stator support fitting 33, and the stator 32 have at their center an axially extending through-hole 34, and the output shaft 35 of the motor 30 is rotatably inserted into the through-hole 34. And, as shown in FIG. 1, both end portions of the output shaft 35 are rotatably supported by a first bearing 36a provided on the speed reduction mechanism 22 side and a second bearing 36b provided on the bottom plate side of the motor housing 31.

A disc-like bottom plate portion 38 provided at one axial end (the right-hand end as seen in FIG. 1) of the rotor 37 is coaxially connected to the output shaft 35 of the motor 30 so as to be incapable of relative rotation. As a result, the output shaft 35 of the motor 30 can rotate together with the rotor 37. Further, between the bottom plate portion 38 of the rotor 37 and the second bearing 36b, a cooling fan 39 is connected to the output shaft 35 of the motor 30 so as to be incapable of relative rotation. The cooling fan 39 is configured to rotate with the output shaft 35 to create an airflow, which can cool the inside of the motor case 31. In the bottom plate portion 38 of the rotor 37, there is provided a ventilation hole 38h through which a cooling air created by the cooling fan 39 passes.

The rotor 37 of the motor 30 includes a rotor main body 370 arranged around the stator 32, and the above-mentioned bottom plate portion 38 that connects the rotor 37 to the output shaft 35 of the motor 30. As shown in FIG. 2, the rotor main body 370 includes an outer cylinder portion 372 made of a tubular ferromagnetic member (for example, iron), and a permanent magnet 374 provided on the inner peripheral surface of the outer tubular portion 372. And, the permanent magnet 374 is circumferentially divided into eight equal portions, alternately forming N-poles and S-poles.

As the permanent magnet 374, a neodymium magnet is used which is a rare-earth magnet whose main components are neodymium, iron, and boron.

As shown in FIG. 2, the rotor 32 of the motor 30 is provided with six teeth 321 formed at equal circumferential intervals, and with slots 323 formed as groves extending axially between each tooth 321. Further, winding wires 325 are wound around each tooth 321 of the stator 32 by use of the slots 323. A three-phase connection by star connection or delta connection is applied with the winding wires 325 wound around each tooth 321.

In this way, the motor 30 is an 8-pole/6-slot outer rotor type brushless motor.

Next, with reference to FIGS. 3 and 4, the 8-pole/6-slot outer rotor type motor according to the example will be explained compared with the conventional 4-pole/6-slot outer rotor type motor.

Figure 3:
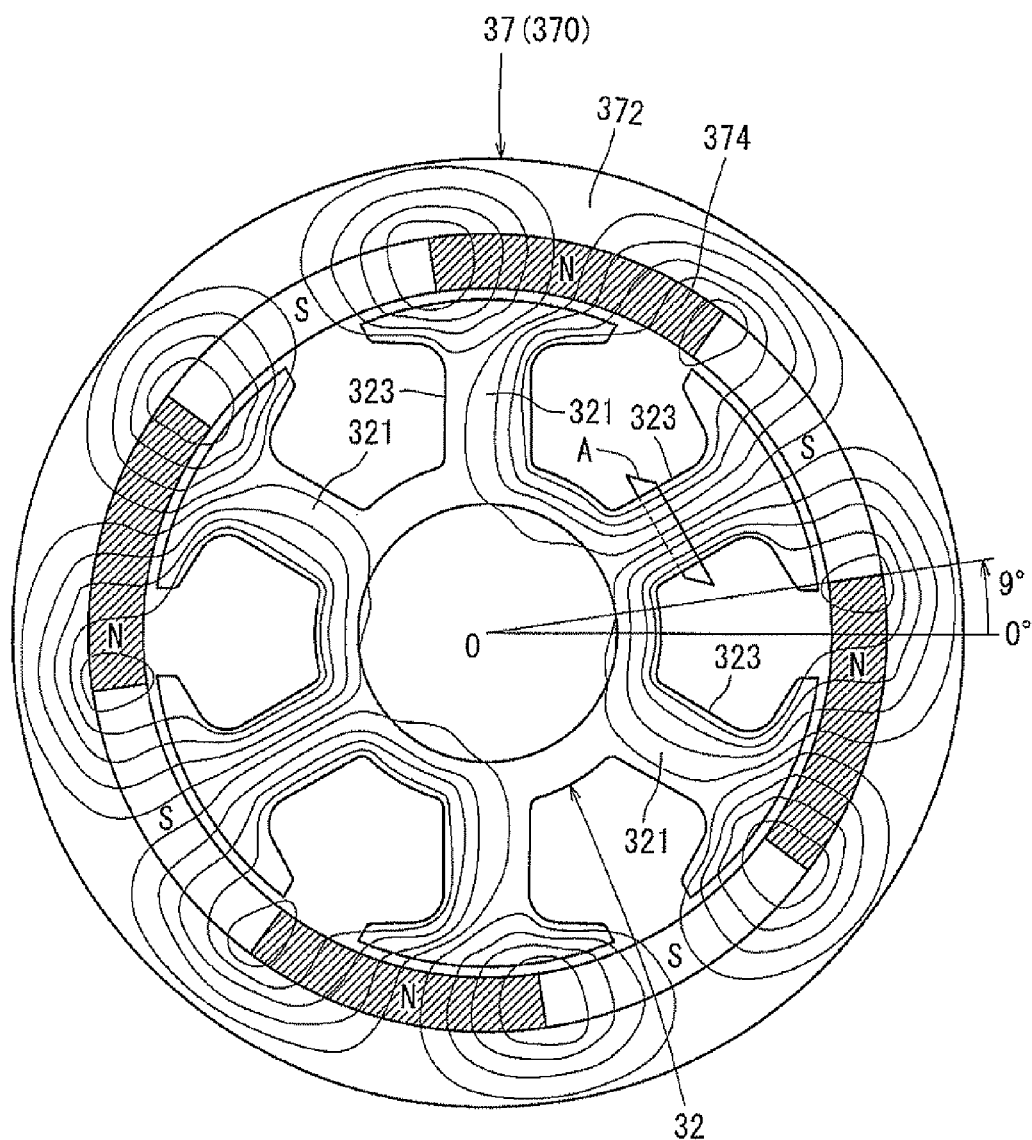
FIG. 3 is a schematic diagram showing a magnetic flux caused by a permanent magnet of the motor (8-pole/6-slot motor) of the electric power tool.

FIG. 3 shows how the magnetic flux of the permanent magnet 374 (indicated by the narrow lines) passes through the magnetic circuit formed by the rotor 37 and the stator 32 in the 8-pole/6-slot outer rotor type motor 30 (rotation angle: 9 degrees). Further, FIG. 4 shows the relationship between the rotation angle of the rotor 37 and the amount of magnetic flux when the magnetic flux of the permanent magnet 374 passes through a specific tooth 321 of the stator 32 (Refer to section A of FIG. 3). All of the six teeth 321 of the motor 30 are of the same configuration and the same size, and thus the characteristics as shown in FIG. 4 are applied to all of teeth 321 as well as the specific tooth 321.

As shown in FIG. 3, by setting the number of poles of the permanent magnet 374 to eight and by setting the number of slots 323 of the stator 323 to six, the width of each magnetic pole of the permanent magnet 374 in the circumferential direction (length of arc) can be reduced by half as compared with that in the prior art, while remaining the size of each portion of the motor 30 unchanged. Accordingly, the amount of magnetic flux passing through each magnetic pole of the permanent magnet 374 can be reduced approximately by half.

Thus, during the rotation of the rotor 37 around the stator 32, even when the magnetic flux from the magnetic poles (e.g., N-poles) of the permanent magnet 374 concentrates in one tooth 321 of the stator 32, the amount of magnetic flux of each magnetic pole is reduced by half as compared with that in the prior art, thus avoiding occurrence of magnetic saturation.

Figure 4:
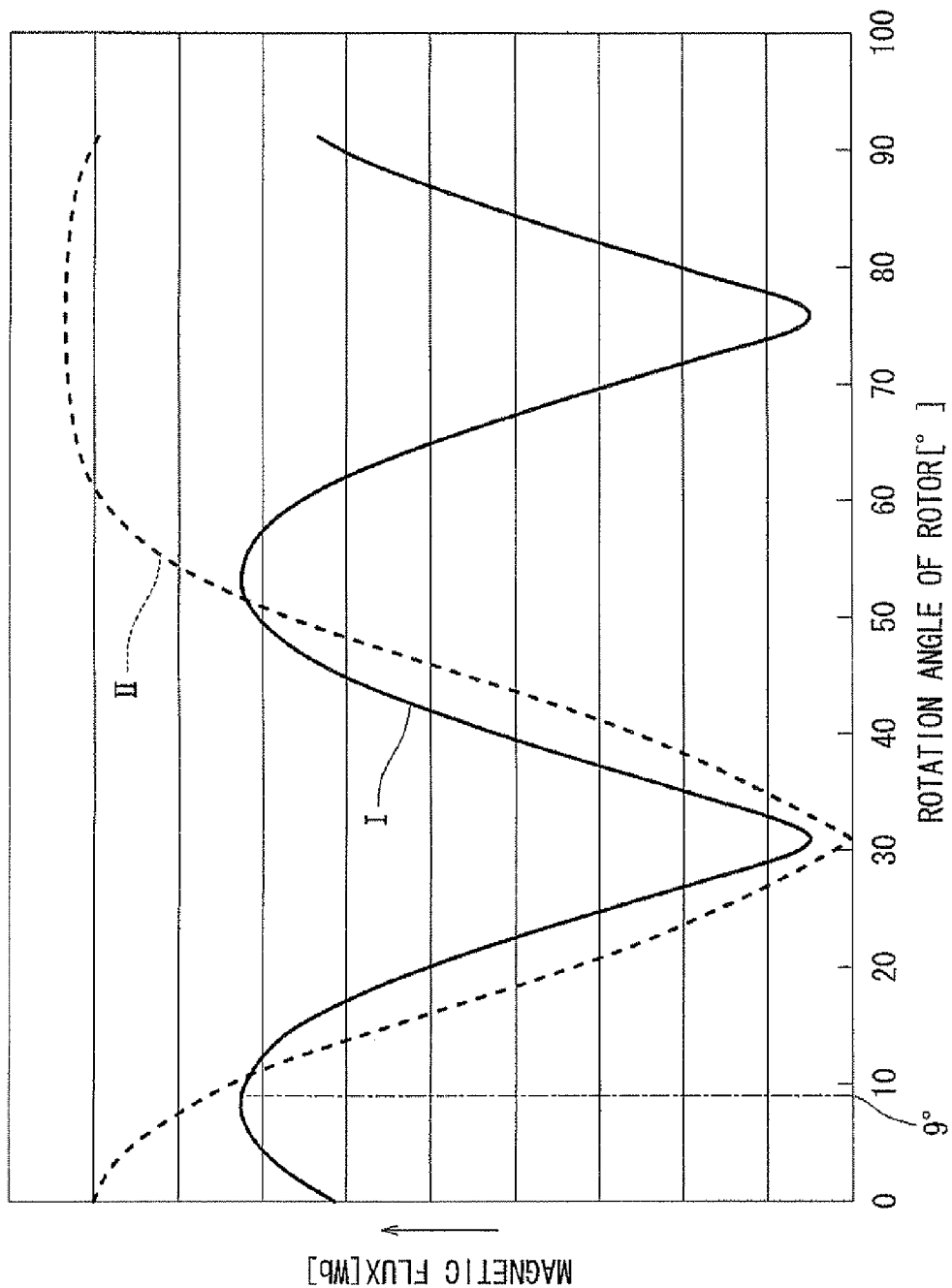
FIG. 4 is a graph showing the relationship between the rotation angle of a rotor and the amount of magnetic flux passing through a tooth of a stator.

In FIG. 4, characteristic I (indicated by the solid line) shows a change in the amount of magnetic flux passing through a specific tooth 321 of the 8-pole/6-slot motor according to the example, and characteristic II (indicated by the dotted line) shows a change in the amount of magnetic flux passing through a specific tooth of the conventional 4-pole/6-slot motor.

As indicated by the characteristic II, in cases where the conventional 4-pole/6-slot motor is used, magnetic saturation occurs when the magnetic flux concentrates in a specific tooth 321 at a rotation angle of approximately 60 degrees to 90 degrees, and more magnetic flux may not be passed through the tooth 31.

In contrast, as indicated by the characteristic I, in cases where the 8-pole/6-slot motor is used, such magnetic saturation does not occur, and thus there is no such limitation to the passage of magnetic flux as mentioned above when the flux passes through a specific tooth 321. Accordingly, as compared with the conventional 4-pole/6-slot motor, in cases where the 8-pole/6-slot motor is used, the electromotive force induced in the winding 325 (induced voltage V ($V = n \times d\Phi/dt$)) can increase (refer to FIGS. 5 and 6), where n is the winding number of the winding 325, $\Phi$ is the magnetic flux, and t is the time.

Figure 5:
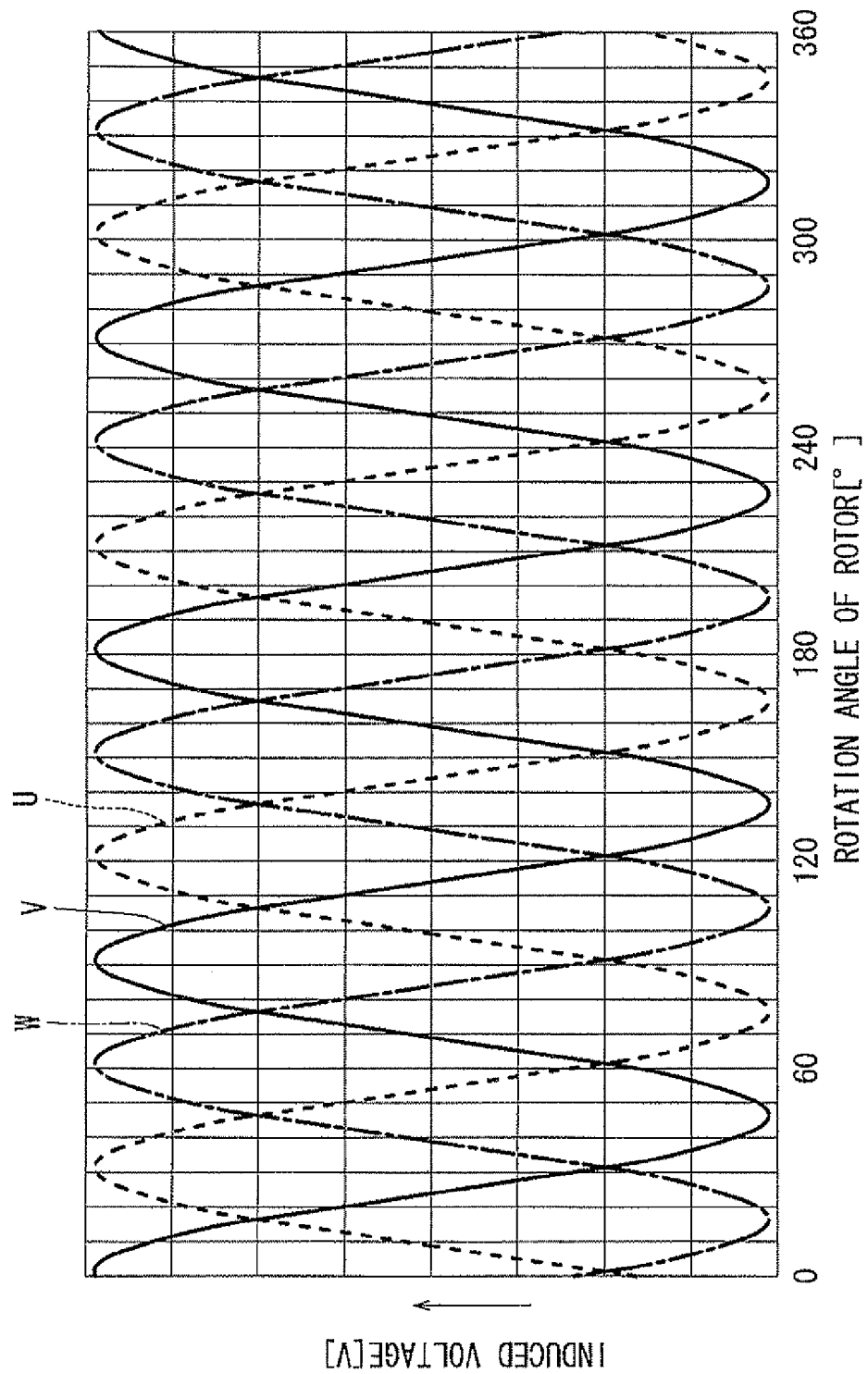
FIG. 5 is a graph showing the relationship between rotation angle of the motor (8-pole/6-slot motor) and an induced voltage generated in a winding in the motor.
Figure 6:
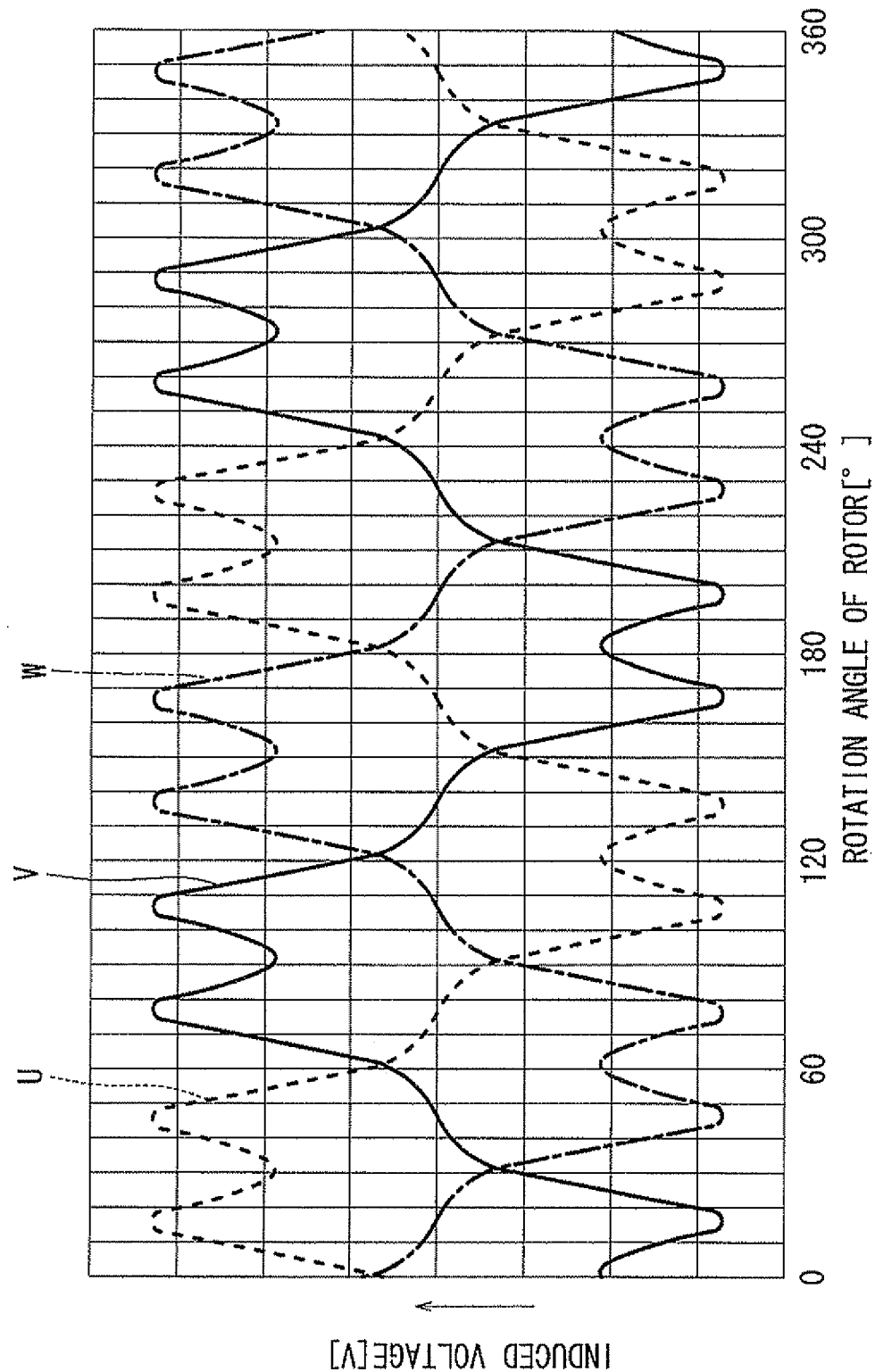
FIG. 6 is a graph showing the relationship between rotation angle of the motor (4-pole/6-slot motor) and an induced voltage generated in a winding in the motor.
Figure 7:
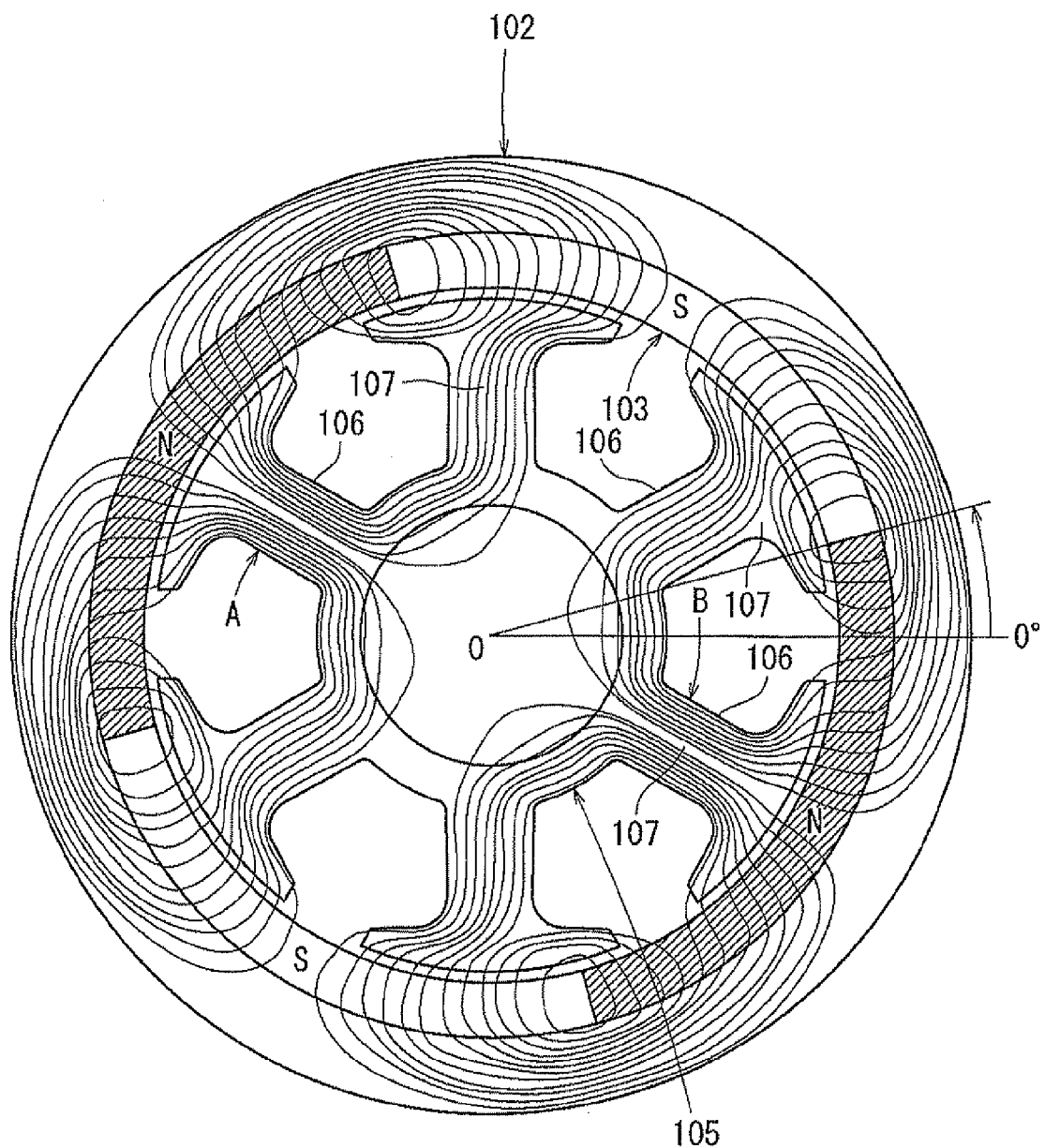
FIG. 7 is a schematic diagram showing a magnetic flux caused by a conventional outer rotor type motor.

FIG. 5 shows the induced voltage V induced in each winding 325 (U-phase, V-phase, W-phase) in the 8-pole/6-slot motor 30 when the rotor 37 rotates. FIG. 6 shows the induced voltage V induced in each winding (U-phase, V-phase, W-phase) in the 4-pole/6-slot motor 30 when the rotor rotates.

As is apparent from FIGS. 5 and 6, in cases where 8-pole/6-slot motor is used, the induced voltage V induced in each winding 325 becomes large as compared with the case where the conventional 4-pole/6-slot motor is used, and thus the output of the motor 30 becomes large. As a result, a rotational torque can be increased even when the RPM (revolution per minute) of the motor 30 is not changed.

According to the example, the number of poles of the permanent magnet 374 of the rotor 37 is set to eight, and the number of slots of the stator 32 is set to six. That is, the ratio of the number of poles of the permanent magnet 374 of the rotor 37 to the number of slots of the stator 32 is set to 4 to 3.

In this way, by increasing the number of poles of the permanent magnet 374 from four to eight, the width of each magnetic pole of the permanent magnet 374 in the circumference direction (length of arc) can be reduced by half, while remaining the number of slots of the motor 30 at six and the size of each portion of the motor 30 unchanged. Thus, the amount of magnetic flux passing through a magnetic pole of the permanent magnet 374 can be reduced approximately by half.

As a result, during the rotation of the rotor 37 around the stator 32, even when the magnetic flux from the magnetic poles (e.g., N-poles) of the permanent magnet 374 concentrates in one tooth 321 of the stator 32, the amount of magnetic flux can be reduced by half as compared with that in the prior art, thus avoiding occurrence of magnetic saturation. Accordingly, when a high performance magnet 374 is used, its performance can be fully achieved. That is, a high performance of the magnet 374 can be achieved without changing the size of the outer rotor type motor 30.

The above construction may not be limited by the above-described example and various changes may be made without departing from the scope of the invention. For example, the above example shows that the number of poles of the permanent magnet 374 of the rotor 37 is set to eight, and the number of slots of the stator 32 is set to six. However, it is also possible to change the number of poles and the number of slots as needed, while the ratio of the number of poles of the permanent magnet of the rotor to the number of slots of the stator being set to 4 to 3. For example, it is also possible to set the number of poles of the permanent magnet 374 of the rotor 37 to twelve, and to set the number of slots of the stator 32 to nine. Further, it is also possible to set the number of poles of the permanent magnet 374 of the rotor 37 to sixteen, and to set the number of slots of the stator 32 to twelve.

As a result, a high performance of the motor 30 can be achieved without increasing the diameter of the motor of the electric power tool.

Further, the above example shows that the construction is applied to a portable circular saw, but the construction may be applied to another type of electric power tools other than a portable circular saw, for example an electric sander.

I claim:

1. An electric power tool with a motor that includes a stator having a plurality of teeth formed circumferentially at equal intervals and axially extending groove-like slots between each tooth, with winding wires being wound around the slots of each tooth, and includes a rotor coaxially surrounding the stator and having a permanent magnet of a plurality of poles on an inner peripheral surface that faces radial distal end surfaces of the teeth of the stator, wherein the number of poles of the permanent magnet of the rotor and the number of slots of the stator are respectively twelve and nine, or sixteen and twelve;

the stator is supported by a stator-support fitting member located within a motor case that houses the motor;

the stator su ort fitting member includes a disc portion that covers an opening of the motor case and a tubular portion that axially protrudes at the center of the disc portion; and the stator is coaxially connected to a distal end of the tubular portion wherein the stator-support member is fixed to a housing of a speed reduction mechanism that reduces a rotational speed of the motor.

2. The electric power tool according to claim 1, wherein the permanent magnet of the rotor made of a rare-earth magnet.

3. The electric power tool according to claim 2, wherein the permanent magnet of the rotor made of a rare-earth magnet whose main components are neodymium, iron, and boron.

4. The electric power tool according to claim 1, further comprising:

a flat-plate-like base; and a main body portion of the electric power tool that is provided on the base;

wherein the main body portion includes the motor, the speed reduction mechanism, a spindle that is an output shaft of the speed reduction mechanism, and a disc-like rotary blade that is mounted to the spindle.

5. The electric power tool according to claim 4, wherein the flat-plate-like base is configured to be held in face contact with an upper surface of a workpiece to be cut; and a lower side of the rotary blade protrudes downwardly from a lower surface of the base such that the protruding part of the rotary blade cuts off the workpiece.

* * * * *

UNITED STATES PATENT AND TRADEMARK OFFICE
CERTIFICATE OF CORRECTION

| | | |
|---|---|---|
| PATENT NO. | : 8,872,398 B2 | |
| APPLICATION NO. | : 13/466443 | |
| DATED | : October 28, 2014 | |
| INVENTOR(S) | : Kenichi Ota | |

It is certified that error appears in the above-identified patent and that said Letters Patent is hereby corrected as shown below:

In The Claims

Claim 1, Column 6, line 36, "the stator su ort fitting member" should read --the stator-support fitting member--

Signed and Sealed this
Thirtieth Day of December, 2014

Michelle K. Lee
*Deputy Director of the United States Patent and Trademark Office*